(12) United States Patent
Jacobs et al.

(10) Patent No.: US 11,303,124 B2
(45) Date of Patent: Apr. 12, 2022

(54) METHOD AND SYSTEM FOR DEMAND-RESPONSE SIGNAL ASSIGNMENT IN POWER DISTRIBUTION SYSTEMS

(71) Applicant: NEC Laboratories Europe GmbH, Heidelberg (DE)

(72) Inventors: Tobias Jacobs, Mannheim (DE); Mischa Schmidt, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 1073 days.

(21) Appl. No.: 15/912,610

(22) Filed: Mar. 6, 2018

(65) Prior Publication Data

US 2019/0190265 A1 Jun. 20, 2019

Related U.S. Application Data

(60) Provisional application No. 62/599,804, filed on Dec. 18, 2017.

(51) Int. Cl.
| | | |
|---|---|---|
| *H02J 3/14* | (2006.01) | |
| *G06N 3/08* | (2006.01) | |
| *G06Q 10/04* | (2012.01) | |
| *G06Q 50/06* | (2012.01) | |

(52) U.S. Cl.
CPC .............. *H02J 3/14* (2013.01); *G06N 3/088* (2013.01); *G06Q 10/04* (2013.01); *G06Q 50/06* (2013.01); *H02J 2310/14* (2020.01)

(58) Field of Classification Search
None
See application file for complete search history.

(56) References Cited

U.S. PATENT DOCUMENTS

| | | | | |
|---|---|---|---|---|
| 2014/0343983 | A1* | 11/2014 | Narayan | G06Q 10/04 705/7.12 |
| 2015/0046221 | A1* | 2/2015 | Narayan | H02J 3/008 705/7.31 |
| 2015/0269195 | A1* | 9/2015 | Aisu | G06F 16/254 706/12 |
| 2015/0371151 | A1* | 12/2015 | Georgescu | G06N 20/00 706/12 |

OTHER PUBLICATIONS

Nagy et al., "Reinforcement learning for demand response: A review of algorithms and modeling techniques," Elsevier, 2018, 18pg. (Year: 2018).*

(Continued)

*Primary Examiner* — Ryan D. Coyer
(74) *Attorney, Agent, or Firm* — Leydig, Voit & Mayer, Ltd.

(57) ABSTRACT

A method for providing a demand-response (DR) signal assignment includes initializing reinforcement learning (RL) agents, each having an exploration scheme and being assigned to a consumer, with initial models about respective RL environments of the consumers. The RL agents send the models to an optimizer. The optimizer computes a DR signal assignment using the models. The RL agents send DR signals in accordance with the DR signal assignment to the consumers so as to aggregately achieve a load reduction by the consumers over a time window. The RL agents monitor the consumers over the time window, and update the models based on the monitoring.

15 Claims, 2 Drawing Sheets

(56) References Cited

OTHER PUBLICATIONS

Kim et al., "Dynamic Pricing and Energy Consumption Scheduling With Reinforcement Learning," IEEE, 2016, 12pg. (Year: 2016).*
Yang et al., "Reinforcement learning for optimal control of low exergy buildings," Elsevier, 2015, 10pg. (Year: 2015).*
Zheng Wen, et al., "Optimal Demand Response Using Device Based Reinforcement Learning", arXiv:1401.1549v2, Jun. 28, 2014, pp. 1-23.
Leo Raju, et al., "A Novel Approach for Optimization of Smart Micro-grid Using Multi Agent Reinforcement Learning", Int J Adv Engg Tech/vol. VII/Issue II, Apr.-Jun. 2016, pp. 27-34.
Dileep Kalathil, et al., "Online Learning for Demand Response", Communication, Control, and Computing (Allerton), 2015, $53^{rd}$ Annual Allerton Conference on Communication, Sep. 29, 2015-Oct. 2, 2015, pp. 1-7.

* cited by examiner

METHOD AND SYSTEM FOR DEMAND-RESPONSE SIGNAL ASSIGNMENT IN POWER DISTRIBUTION SYSTEMS

CROSS-REFERENCE TO RELATED APPLICATION

Priority is claimed to U.S. Provisional Patent Application No. 62/599,804, filed on Dec. 18, 2017, the entire disclosure of which is hereby incorporated by reference herein.

FIELD

The present invention relates to power distribution systems which utilize demand-response (DR) signals for load reduction.

BACKGROUND

Electric power distribution systems world-wide are facing the challenge of integrating an increasing share of renewable energy sources, such as solar and wind power, which cannot be flexibly turned on and off to match the demand and stabilize the grid. Transport grid operators (TSO) and distribution grid operators (DSO) are obliged to make sure that at any time the power supply and demand are balanced. DR programs of TSOs and DSOs offer incentives to large-scale industrial and commercial consumers to make their electric loads flexible on request to allow the TSOs and DSOs to provide grid stability. The load reduction potential required to participate in such programs is in the order of magnitude between 100 kW and a few MW. These large-scale consumers are thereby ensured to be reliable and committed.

SUMMARY

In an embodiment, the present invention provides a method for providing a demand-response (DR) signal assignment. The method includes the steps of:
a) initializing reinforcement learning (RL) agents, each having an exploration scheme and being assigned to a consumer, with initial models about respective RL environments of the consumers;
b) sending, by the RL agents, the models to an optimizer;
c) computing, by the optimizer, a DR signal assignment using the models;
d) sending, by the RL agents, DR signals in accordance with the DR signal assignment to the consumers so as to aggregately achieve a load reduction by the consumers over a time window;
e) monitoring, by the RL agents over the time window, the consumers; and
f) updating, by the RL agents, the models based on the monitoring.

BRIEF DESCRIPTION OF THE DRAWINGS

The present invention will be described in even greater detail below based on the exemplary figure. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following.

DETAILED DESCRIPTION

Figure 1:
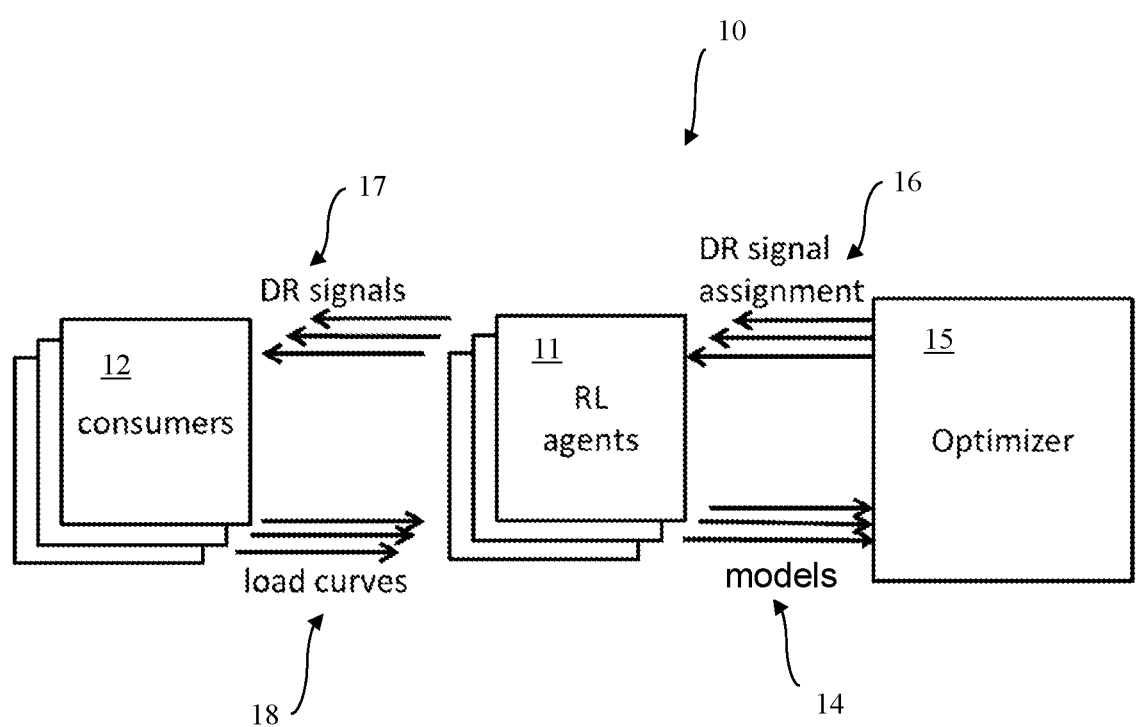
FIG. 1 is a schematic overview of a system architecture according to an embodiment of the present invention.

Embodiments of the present invention provide a method and system for DR signal assignment and/or for aggregating a DR offering, especially from unreliable sources.

Embodiments of the present invention provide a method and system to join the energy DR potential of unreliable and uncommitted load flexibility sources with initially unknown behavior. Examples of such sources are private households and small businesses. The invention enables to create an aggregated DR system that can provide load reductions of a predictable quantity in a specified time window from such sources.

In particular, despite being unreliable and unpredictable, the inventors have recognized that private consumers of electricity do have some amount of load flexibility (e.g., by using smart appliances or thermostatically controlled loads) which is likely to increase in the future with the next generations of appliances. The load reduction potential of each individual household is expected to remain within the order of a few kW. Similar observations hold for small businesses.

Even though the small private consumers have some load flexibility, the flexibility for one individual small consumer is insignificant compared to the large-scale consumers. Moreover, there are further challenges in providing a system in which small consumers can contribute to load reduction. For example, small consumers have a large amount of day-to-day fluctuation in their load curves and load reduction potential. Accordingly, small consumers cannot guarantee specific load reductions. Furthermore, different small consumers have different devices at their disposal and different personal preferences, and therefore react differently to DR signals. Even the average load reduction or load shifting potential of small consumers can only be estimated.

Despite these challenges, embodiments of the present invention provide flexible load aggregation methods and systems for small consumers. In particular, embodiments of the present invention provide that, given a load reduction target (for example, determined by start time and end time of a load reduction time window), DR signals are sent to the consumers so as to: (a) achieve a predefined load reduction across the whole targeted time window, or (b) to maximize the aggregated load reduction across the whole targeted time window.

Accordingly, embodiments of the present invention provide a number of improvements to the electrical grid to which the consumers are connected and effect technological improvements in the field of power distribution by improving the ability of consumers, and especially small consumers, to contribute to load reductions.

The DR signals which are sent to the consumers can take different forms. For example, the DR signal protocol OpenADR defined by the OpenADR Alliance admit a wide range of DR signals, including but not limited to price signals and explicit load reduction requests.

There are various ways of permitting small consumers to contribute to load reduction in a DR system. One approach would be to send the targeted load reduction to all participating consumers as a DR signal. While simple, this approach has several limitations. First, it ignores the fact that not all consumers are able to sustain the load reduction for the whole time window required. For example, thermostatically controlled loads like heaters have to be switched on again after some time, and consumers have preferences on when smart washing machines should have completed the washing cycle. Furthermore, this approach is likely to unnecessarily ask consumers for load reduction (e.g. when the reduction targets would already be achieved with a subset of consumers). Finally, this approach is not applicable to situations where price signals are used to achieve a load reduction target.

Another approach would be to compute an optimal (or near-optimal) assignment of DR signals to consumers. Here individual consumers receive individual signals (e.g. different time windows, different price signals, requests on different days, etc.), and some model of how each consumer reacts to each signal is employed in order to compute an optimal or near-optimal assignment of requests to consumers. The problem with this approach is the unavailability of a behavior model for the consumers. One can try to learn user models over time by experience from previous interactions, but then incorrect initial assumptions will easily lead the system to converge to suboptimal behavior.

A further approach would be to use reinforcement learning (RL) to learn how to assign signals to consumers. RL uses a reward function to learn how to act (near-) optimally in an unknown environment. Application of the RL paradigm to the given problem has to define the reward. Here it is straightforward to use some metric measuring the extent to which the targeted load reduction is reached, or how much reduction is reached. Taking an action consists of sending one signal to every consumer. Thus, the action space is exponentially large in the number of consumers, and therefore it will take require a large number of explorative actions (and thus many unsatisfied load reduction targets) until the learning algorithm converges to a good policy. Alternative applications of RL depend on the unrealistic assumption that each consumer achieves a constant load reduction over the requested time window (see Kalathil, Dileep, et al., "Online learning for demand response," Communication, Control, and Computing (Allerton), 53rd Annual Allerton Conference on IEEE (2015), which is incorporated by reference herein).

An embodiment of the present invention provides a novel combination of discrete optimization and RL to solve the DR signal assignment problem defined above.

FIG. 1 shows a schematic overview of a system 10 according to an embodiment of the invention. RL agents 11 are each assigned to one of the consumers 12. At system initialization, the RL agents 11 are initialized with models 14, which can also be referred to as beliefs, about RL environments of their respective consumers 12. For example, the initial model can be randomly assigned or the initial model could be estimated from metadata about the consumer (address, number and type of devices, etc.). The RL agents 11 send their models 14 to an optimizer 15 which uses the models 14 to determine a DR signal assignment 16 for each of the RL agents 11 and their corresponding consumers 12. The RL agents 11 then use the DR signal assignment 16 to generate DR signals 17 which are sent to their respective consumers 12 in order for the individual consumers 12 to take actions (e.g., reduce load over a specified time window) specified by the respective DR signals 17 to obtain a specified reward. After the system initialization, the RL agents 11 continue to monitor the RL environments of their respective consumers 12 to update their models 14, for example, based on load curves 18. Load curves typically show the load over time. By subtracting load curves from a baseline load curve, a load reduction curve can be obtained, which, according to an embodiment, can be used to update the models. In other embodiments, other information which can be monitored and considered for updating the models include power storage levels of batteries or electrical devices of the consumers, a maximum load reduction permitted by electrical devices/appliances of the consumers and/or consumer-specified time windows for tasks to be performed by smart appliances. The updated models 14 are sent to the optimizer 15, for another round of DR signal assignment 16 and assignment of DR signals 17. This loop can be repeated as desired, for example, based on specified time windows within which a minimum or target load reduction is to be achieved.

The RL agents 11 comprise one or more computer processors for determining and updating their models 14 using as input data from the consumers 12, such as load curves 18 or other data determined by sensors or measurement devices indicating power usage, consumption, electric load, etc. of the consumers 12 as a function of time. This information can be stored temporarily or permanently in a physical memory of the RL agents 11 and/or their respective consumers 12. The consumers 12 comprise electrical devices or appliances capable of reducing load over a specified time window, sensors or measurement devices for determining an amount of power consumed and one or more processors or transmitters for sending this information to the RL agents 11. The optimizer 15 includes one or more computer processors and/or servers for computing the DR signal assignment 16 using the models 14, which can be stored and updated in a physical memory of the optimizer 15.

According to an embodiment, a method for DR aggregation and DR signal assignment, in a computer system schematically illustrated in FIG. 1, comprises the following steps:

Step 1: Discretization. A day is divided into short time slices. In cases where DR is limited to certain daily time windows (for example, the hours of morning, midday, and evening load peaks), the time slices outside those time windows are ignored. The remaining M time slices have a length of preferably 10, 15, 20, or 30 minutes. For each time slice m, the load reduction achieved by any consumer C is then represented by a single number called the discrete reduction of consumer C at time m. This number is defined as the minimum value of the load reduction curve of consumer C across the mth time slice. By summing up the discrete reduction of all consumers at any time m, a lower bound on the minimum aggregated load reduction during the mth time slice is obtained. The shorter the time slices are chosen, the more closely that lower bound approximates the true minimum aggregated load reduction.

Step 2: Representing consumers as multi-objective RL environments. Each consumer C is represented as a distinct RL environment in which a consumer-specific RL agent acts. In each consumer RL environment, the action space consists of the possible DR signals (like reduction time windows, reduction amounts, utility prices, etc.) that can be sent to the consumer. The reward which is sent internally as a signal in the RL environment to guide the learning, instead of a single scalar, is an m-dimensional vector with an entry for each time slice, which represents the discrete reduction for that consumer C at that time. A multi-objective RL environment is obtained for each consumer C, where the objective is given by the load reduction vector.

Step 3: Combine the RL agents and combinatorial optimization to compute the an optimal DR signal assignment under the current model. For each consumer C, an RL agent is used to maintain the current model about the respective multi-objective RL environment. The RL agents drive the exploration to find the most useful signals to send to their consumer C. An optimizer is employed to collect, for any day, the current model of all RL agents and compute an optimal assignment of DR signals to consumers under assumption of the current model. The assignment of a DR signal is then passed to the RL agent, who executes the assignment by sending the signal to the respective consumer C and monitors the consumer's behavior. Based on the monitoring, the RL agent updates its model.

The models of the RL agents can be also referred to as beliefs and are based on a belief or model representation which supports systematic exploration, such as optimism in the face of uncertainty, posterior sampling, upper confidence bounds, etc. Thus, the RL agents can represent the models in different ways, and the optimizer is able to use different optimization targets and techniques the optimizer. The exploration can be driven by the optimizer, based on the RL agents' model representations, or by each individual RL agent taking exploration actions. Furthermore, both tabular model representation and function approximation are applicable.

For example, one way to represent the model or belief is to maintain a Gaussian distribution (determined by mean and variance) for the load reduction in each time window for each signal. Then, an agent applying the "upper confidence bound" exploration method could, e.g., send the upper bound of the 90% confidence interval to the optimizer. The optimizer then computes an optimal assignment (of signals to consumers) based on this optimistic assumption of the achievable load reduction. After having assigned the respective signals to the consumers, the agent monitors how much reduction has been achieved and updates the Gaussian distribution accordingly.

In a preferred embodiment, the RL agent model representation indicates the RL agent's individual certainty about that model, e.g., in the form of confidence intervals. The confidence level can be determined based on how much variance in load the consumer has over time or within certain time windows. Additionally, a lack of confidence can come from not yet having collected enough data about a specific signal sent to a specific consumer. This information can then be used by the optimizer to assign the DR signals with greater confidence.

Embodiments of the present invention are especially advantageous when applied to small consumers by using the novel approach discussed above to make it feasible to aggregate many small consumers' individual flexibilities. However, embodiments of the present invention can also accommodate larger consumers as well.

According to various embodiments of the present invention, variations including, e.g., aggregating multiple consumers virtually (e.g., by means of clustering/grouping similar consumers together) to be managed/represented by a single RL agent can be provided.

Advantages provided by embodiments of the present invention include:

1) Defining multiple objectives by discretizing the reduction achieved over time, using the minimum load reduction achieved in each time window as the discrete value.

2) Providing solution architecture including an optimizer and RL agents, interacting in the way described above to provide the above-described improvements to the computer system including the optimizer and the RL agents.

3) Fast convergence to an optimal or near-optimal DR signal assignment.

4) Providing that RL agents can be deployed decentralized close to the consumer; thus, meter readings do not need to be processed and stored centrally.

5) Easily providing to dynamically add and remove consumers, because the RL agents of other households remain unaffected.

6) Allowing that not all consumers need to support reductions in the same M slices. The optimizer can exploit overlapping slices of different consumers as needed.

Figure 2:
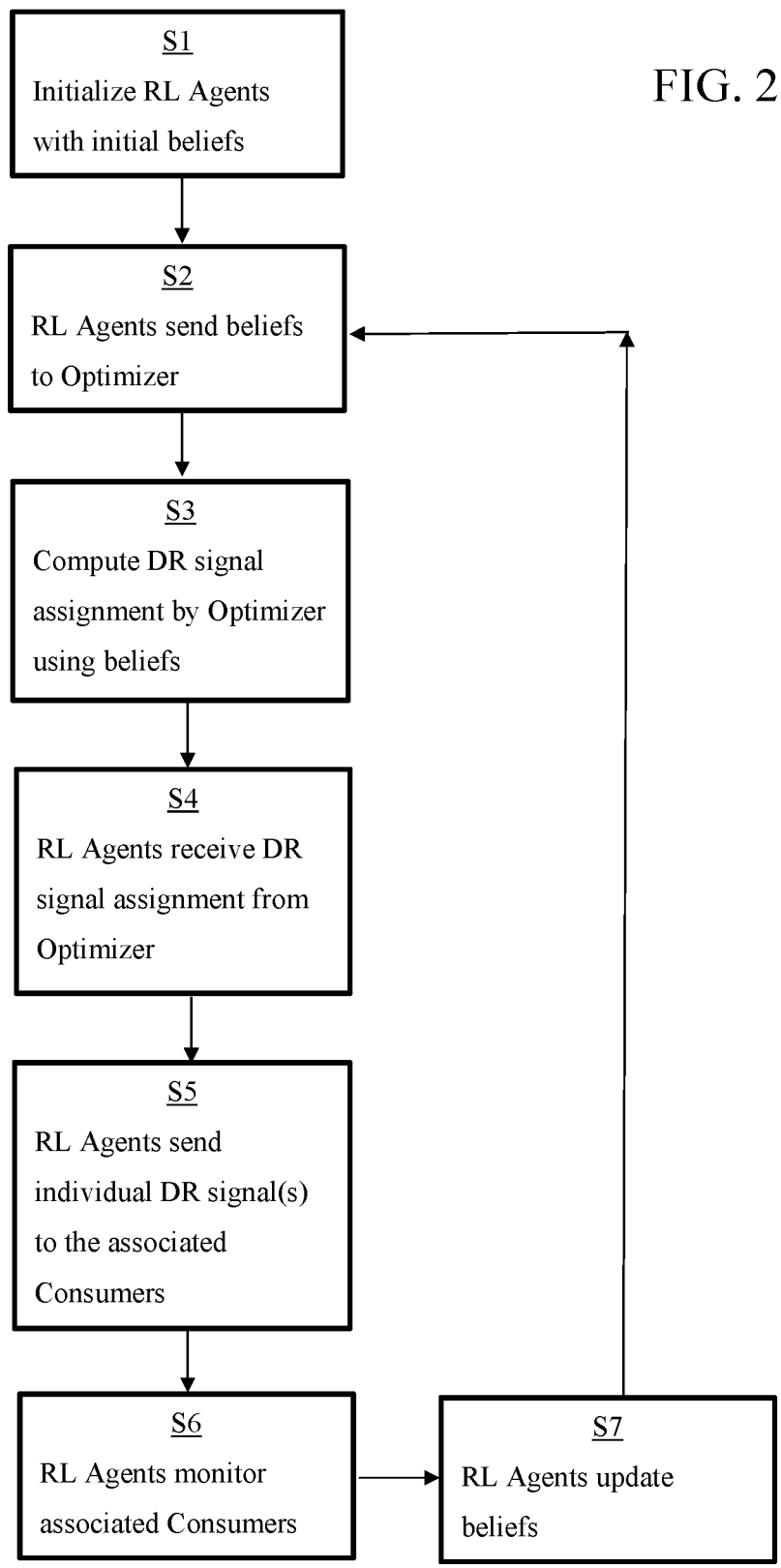
FIG. 2 is a flowchart illustrating steps of a method for achieving an aggregated load reduction in accordance with an embodiment of the present invention.

Referring to FIG. 2, a method according to an embodiment of the present invention comprises:

1) Initializing RL agents with initial models (S1).

2) Passing, by the RL agents, the models to the optimizer, the models being based on the exploration scheme(s) of the RL agents (S2).

3) Computing, by the optimizer, an optimal signal assignment using the models (S3).

4) Receiving, by the RL agents, the signal assignment from the optimizer (S4).

5) Passing, by the RL agents, the signal assignment to the associated consumers in the form of individual DR signals so as to achieve an aggregated load reduction (S5).

6) Monitoring, by the RL agents, the consumers (S6).

7) Updating, by the RL agents, the models based on the monitoring (S7).

Steps S2-S7 are repeated to provide the fast convergence to the optimal or near-optimal DR signal assignment in further iterations.

In a situation where consumers' flexibilities can change drastically, it is possible that the responsible RL agent's models can become outdated and may mislead the optimizer. However, according to embodiments of the invention, this can be addressed in numerous ways, e.g. by the optimizer generally striving for a safety margin of reduction, or by agents conservatively representing their models to the optimizer.

Accordingly, embodiments of the present invention provide improvements, to, e.g., smart homes/small businesses and DR servers. Embodiments of the present invention, e.g., as compared to a straightforward RL approach, converge to a global optimum, without the convergence takes weeks, which translates to avoiding lost DR opportunities. Furthermore, with the straightforward RL approach, as opposed to embodiments of the present invention, the solution has to be re-trained from scratch when consumers are added or removed.

Zheng Wen et al., "Optimal Demand Response Using Device Based Reinforcement Learning," arXiv: 1401.1549v2 [cs.LG] (Jun. 28, 2014), which is hereby incorporated by reference herein, uses RL to schedule flexible loads of individual devices of individual users. The method cannot be used to aggregate the demand flexibility of a multitude of consumers, as in embodiments of the present invention, and gives no hints that aggregating demand of consumers would even be possible or desirable.

Leo Raju et al., "A novel approach for optimization of smart micro-grid using multi-agent reinforcement learning," International Journal of Advanced Engineering Technology, vol. VII, issue II, E-ISSN 0976-3945, pp. 27-34 (April-June 2016), which is hereby incorporated by reference herein, applies multi-agent RL to an energy management problem including solar power, a battery, and a consumer. Differences to embodiments of the invention, among others, include: a)

the scope and type of application (embodiments of the present invention apply RL to demand flexible load management) and b) embodiments of the invention combine multiple RL agents with an optimizer, so no direct communication between the RL agents takes place.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for providing a demand-response (DR) signal assignment, the method comprising:
   a) initializing reinforcement learning (RL) agents, each having an exploration scheme and being assigned to a consumer, with initial models about respective RL environments of the consumers;
   b) sending, by the RL agents, the models to an optimizer;
   c) computing, by the optimizer, a DR signal assignment using the models;
   d) sending, by the RL agents, DR signals in accordance with the DR signal assignment to the consumers so as to aggregately achieve a load reduction by the consumers over a time window;
   e) monitoring, by the RL agents over the time window, the consumers; and
   f) updating, by the RL agents, the models based on the monitoring.

2. The method according to claim 1, wherein the RL agents monitor load curves of the respective consumers to update the models.

3. The method according to claim 1, further comprising sending, by the RL agents, the updated models to the optimizer and repeating steps c)-f).

4. The method according to claim 3, wherein a discrete load reduction for each of the consumers is determined for each time window such that multiple objectives are defined for the RL environments, the discrete load reduction representing a minimum load reduction achieved by the respective consumers for each time window.

5. The method according to claim 4, wherein the discrete load reductions are summed to determine a lower bound on the aggregated load reduction.

6. The method according to claim 1, wherein at least one of the RL agents is assigned to multiple consumers that are virtually grouped together.

7. The method according to claim 1, wherein the models indicate respective confidence levels of the RL agents in the models which are used by the optimizer to compute the DR signal assignment.

8. The method according to claim 1, wherein the RL agents are disposed decentralized at respective locations of the consumers.

9. The method according to claim 8, wherein the consumers are individual households having electrical appliances capable of providing a load reduction over the time window.

10. A reinforcement learning (RL) agent for providing a demand-response (DR) signal assignment, the RL agent having an exploration scheme and being assigned to a consumer, the RL agent comprising one or more processors which, alone or in combination, are configured to provide for execution of the following steps:
    a) sending an initial model about a RL environment of the consumer to an optimizer;
    b) receiving a DR signal assignment computed by the optimizer using the initial model and further additional models of further RL agents;
    c) sending a DR signal to the consumer in accordance with the DR signal such that the consumer contributes to an aggregated load reduction achieved over a time window together with further consumers;
    d) monitoring the consumer over the time window; and
    e) updating the initial model based on the monitoring.

11. The RL agent according to claim 10, wherein the RL agent is configured to monitor a load curve of the consumer to update the initial model.

12. The RL agent according to claim 10, being further configured to send the updated model to the optimizer.

13. The RL agent according to claim 10, wherein the model indicates a confidence level of the RL agent in the model which is usable by the optimizer to compute the DR signal assignment.

14. The RL agent according to claim 10, wherein the RL agents is disposed at a location of the consumer.

15. The RL agent according to claim 10, wherein the consumer is an individual household having electrical appliances capable of providing a load reduction over the time window.

* * * * *